United States Patent
Xiang

(10) Patent No.: US 9,432,910 B2
(45) Date of Patent: Aug. 30, 2016

(54) SYSTEM AND METHOD FOR WIFI AUTHENTICATION AND SELECTION

(71) Applicant: FutureWei Technologies, Inc., Plano, TX (US)

(72) Inventor: Zhixian Xiang, Plano, TX (US)

(73) Assignee: Futurewei Technologies, Inc., Plano, TX (US)

(*) Notice: Subject to any disclaimer, the term of this patent is extended or adjusted under 35 U.S.C. 154(b) by 38 days.

(21) Appl. No.: 14/203,252

(22) Filed: Mar. 10, 2014

(65) Prior Publication Data

US 2014/0254364 A1   Sep. 11, 2014

Related U.S. Application Data

(60) Provisional application No. 61/776,521, filed on Mar. 11, 2013.

(51) Int. Cl.
| | |
|---|---|
| *G01R 31/08* | (2006.01) |
| *H04W 48/06* | (2009.01) |
| *H04W 48/14* | (2009.01) |
| *H04W 12/06* | (2009.01) |

(52) U.S. Cl.
CPC .............. *H04W 48/06* (2013.01); *H04W 48/14* (2013.01); *H04W 12/06* (2013.01)

(58) Field of Classification Search
CPC ...................................................... H04W 48/06
USPC ......................................................... 370/232
See application file for complete search history.

(56) References Cited

U.S. PATENT DOCUMENTS

| | | | |
|---|---|---|---|
| 7,185,360 B1* | 2/2007 | Anton et al. ................... 726/3 |
| 8,009,586 B2* | 8/2011 | Chaturvedi ....... H04L 29/12528 370/254 |
| 2004/0246933 A1* | 12/2004 | Valko ..................... H04L 29/06 370/338 |
| 2007/0036120 A1* | 2/2007 | Zhang .................. H04L 12/14 370/338 |
| 2009/0217048 A1* | 8/2009 | Smith .......................... 713/176 |
| 2011/0228671 A1* | 9/2011 | Tuffin ................... H04L 47/746 370/221 |
| 2012/0236709 A1* | 9/2012 | Ramachandran et al. ..... 370/221 |
| 2012/0320827 A1* | 12/2012 | Zhao et al. .................. 370/328 |
| 2013/0035084 A1* | 2/2013 | Song et al. ................... 455/418 |
| 2013/0088956 A1* | 4/2013 | Zhou et al. ................... 370/230 |

(Continued)

FOREIGN PATENT DOCUMENTS

| | | | |
|---|---|---|---|
| CN | 101166363 A | 4/2008 |
| CN | 101990279 A | 3/2011 |

(Continued)

OTHER PUBLICATIONS

Huawei Technologies Co., Ltd., "International Search Report and Written Opinion," International Application Serial No. PCT/CN2012/073193 dated Jun. 11, 2014, 11 pages.

(Continued)

*Primary Examiner* — Gerald Smarth
(74) *Attorney, Agent, or Firm* — Slater Matsil, LLP

(57) ABSTRACT

A method embodiment for network authentication includes selecting, by a user equipment (UE), an access network for establishing a network connection and receiving one or more network authentication status indications for a network associated with the access network. The method further includes implementing a network authentication and selection policy in accordance with the one or more network authentication status indications.

19 Claims, 6 Drawing Sheets

(56) References Cited

U.S. PATENT DOCUMENTS

2013/0094484 A1* 4/2013 Kneckt et al. ............... 370/338
2013/0143542 A1* 6/2013 Kovvali et al. .............. 455/418
2013/0231151 A1* 9/2013 Kneckt et al. ............... 455/515

FOREIGN PATENT DOCUMENTS

CN          102883315 A      1/2013
WO          2012030467 A1    3/2012

OTHER PUBLICATIONS

3rd Generation Partnership Project, Technical Specification Group Services and System Aspects; Architecture enhancements for non-3GPP accesses, (Release 11), 3GPP TS 23.402, V11.8.0, Dec. 2013, 252 pages.

3rd Generation Partnership Project, Technical Specification Group Core Netowork and Terminals; Access to the 3GPP Evolved Packet Core (EPC) via non-3GPP access networks, Stage 3 (Release 11), 3GPP TS 24.302, V11.7.0, Jun. 2013, 61 pages.

3rd Generation Partnership Project, Technical Specification Group Core Netowork and Terminals, Access Network Discovery and Selection Function (ANDSF), Management Object (MO), (Release 11), 3GPP TS 24.312, V11.6.0, Mar. 2013, 173 pages.

IEEE Std 802.11u—2011, Telecommunications and information exchange between systems—Local and metropolitan area networks—Specific requirements, Part II: Wireless LAN Medium Access Control (MAC) and Physical Layer (PHY) Specifications, Amendment 9: Interworking with External Networks, IEEE Standards Association, New York, Feb. 25, 2011, 208 pages.

* cited by examiner

| 302: INFO ID | 304: LENGTH | 306: OI | 308: TYPE | 310: SUBTYPE | 312: RESERVED | 314: PAYLOAD |
|---|---|---|---|---|---|---|
| 2 | 2 | 3 | 1 | 1 | 1 | VARIABLE |

OCTETS

FIG. 3A

TABLE 3: HS2.0 ANQP ELEMENT SUBTYPE DEFINITION

| ELEMENT NAME | SUBTYPE VALUE | DESCRIPTION (SECTION) | EXTENSIBLE |
|---|---|---|---|
| RESERVED | 0 | N/A | - |
| HS QUERY LIST | 1 | 4.1 | - |
| HS CAPABILITY LIST | 2 | 4.2 | - |
| OPERATOR FRIENDLY NAME | 3 | 4.3 | - |
| WAN METRICS | 4 | 4.4 | - |
| CONNECTION CAPABILITY | 5 | 4.5 | - |
| NAI HOME REALM QUERY | 6 | 4.6 | - |
| OPERATING CLASS INDICATION | 7 | 4.7 | - |
| OS PROVIDERS LIST | 8 | 4.8 | YES |
| ANONYMOUS NAI | 9 | 4.9 | - |
| ICON REQUEST | 10 | 4.10 | - |
| ICON BINARY FILE | 11 | 4.11 | - |
| RESERVED | 12-255 | N/A | - |

FIG. 3B

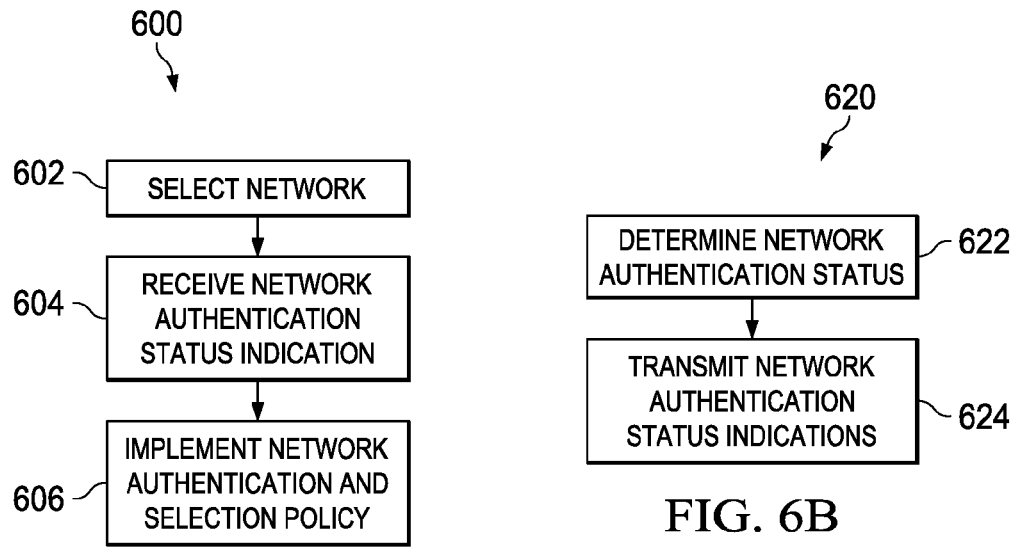
FIG. 6A
FIG. 6B
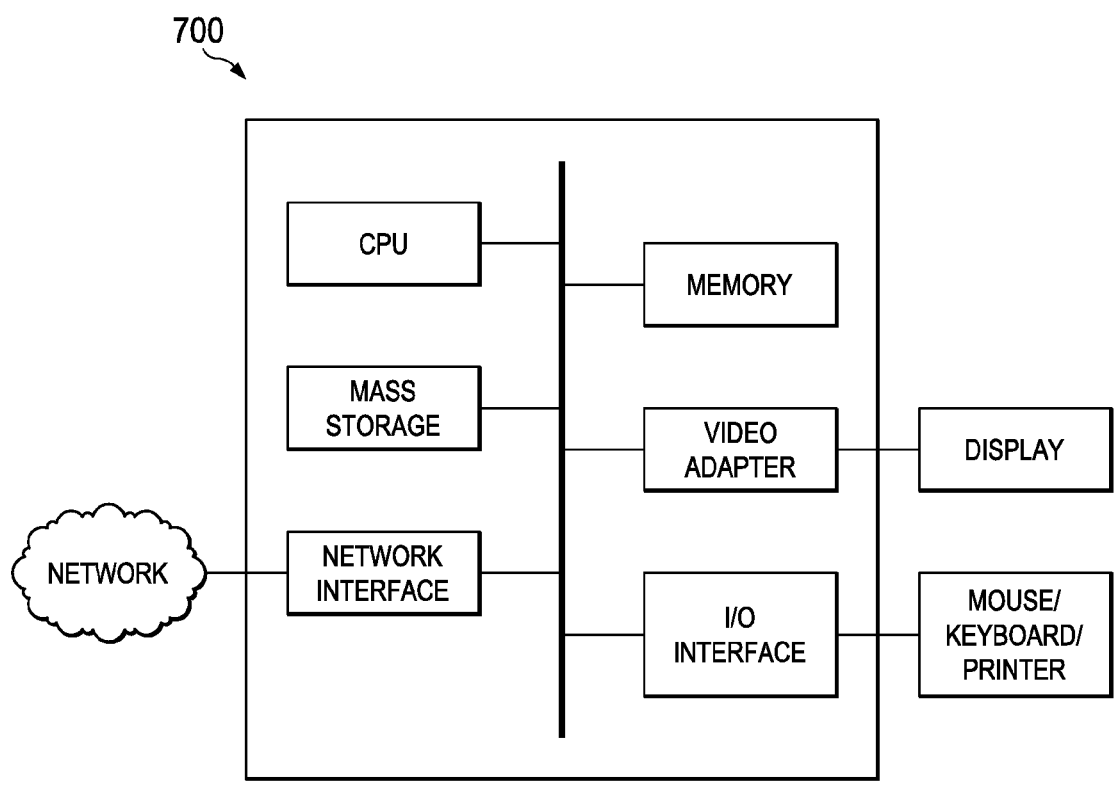
FIG. 7

SYSTEM AND METHOD FOR WIFI AUTHENTICATION AND SELECTION

This application claims the benefit of U.S. Provisional Application No. 61/776,521, filed on Mar. 11, 2013, entitled "System and Method for WiFi Authentication," which application is hereby incorporated herein by reference.

TECHNICAL FIELD

The present invention relates generally to a system and method for wireless communications, and, in particular embodiments, to a system and method for WiFi authentication and selection.

BACKGROUND

Cellular operators are motivated to integrate WiFi access into their existing cellular networks to help meet market demand and increase their competitive edge. Many mobile devices have dual mode (WiFi and cellular) capability. The WiFi Alliance is currently defining a Hotspot 2.0 specification to help dual mode or WiFi-only devices better select a compatible WiFi network that is owned by, subscribed to, or has roaming relationship with the device's cellular operator. This network selection technology may be based on IEEE 802.11u. The Third Generation Partnership Project (3GPP) also defines several mechanisms for a mobile device to select a wireless local area network (WLAN) (e.g., in fixed network) via operator-defined policies that may be statically pre-configured on the UE or dynamically set via an Access Network Discovery and Selection Function (ANDSF) within the network.

To connect to WiFi and cellular networks, devices generally use authentication procedures (e.g., based on a subscriber identity module (SIM) card), which may be carried out seamlessly with little to no input required from the end-user. When devices switch between a WiFi and cellular network or between different WiFi networks, access attempts may lead to a large amount of signalling traffic, for example, during authentication storms. During authentication storms, many authentication requests are sent to the network by multiple devices near one location. The influx of authentication requests may overload affected access networks (ANs) and authentication servers. Authentication storms may be caused by numerous issues with current authentication procedures. For example, authentication procedures are carried out by a device each time it moves to a new AN. Devices that do not have Wi-Fi in its subscription plan may still attempt to authenticate. Authentication storms may also be caused by rapid movement of many devices between different ANs in a short period of time.

There are various proposed solutions to address the issue of authentication storms, and these include solutions on both the network side and the device side. For solutions on the device side, a user equipment (UE) needs to be aware of the overload situation in the authentication server so that the UE may respond accordingly. However, current UEs lack a mechanism to know of an overload before the UE starts an authenticate procedure with the overloaded server, at which time it may be too late for the UE to respond accordingly. Furthermore, when the authentication server is overloaded, it may better for the network to control or influence UE behaviour to avoid worsening the situation. However, current networks lack a mechanism for controlling or influencing UE authentication behaviour.

SUMMARY OF THE INVENTION

These and other problems are generally solved or circumvented, and technical advantages are generally achieved, by preferred embodiments of the present invention which provides a system and method for WiFi authentication.

In accordance with an embodiment, a method for network authentication includes selecting by a user equipment (UE), an access network for establishing a network connection and receiving one or more network authentication status indications for a network associated with the access network. The method further includes implementing a network authentication and selection policy in accordance with the one or more network authentication status indications in accordance with the one or more network authentication status indications.

In accordance with another embodiment, a network device includes a processor and a computer readable storage medium storing programming for execution by the processor. The programming including instructions to select an access network for establishing a network connection and receive one or more network authentication status indications for a network associated with the access network. The programming includes further instructions to implement a network authentication and selection policy in accordance with the one or more network authentication status indications.

In accordance with another embodiment, a method includes determining, by a network device, an authentication status of a network associated with the network device. The method further includes transmitting, to a user equipment (UE), one or more network authentication status indications in accordance with the authentication status of the network.

In accordance with yet another embodiment, a network device includes a processor and a computer readable storage medium storing programming for execution by the processor. The programming including instructions to determine an authentication status of a network associated with the network device. The programming includes further instructions to transmit, to a user equipment (UE), one or more network authentication status indications in accordance with the authentication status of the network.

BRIEF DESCRIPTION OF THE DRAWINGS

For a more complete understanding of the present invention, and the advantages thereof, reference is now made to the following descriptions taken in conjunction with the accompanying drawings, in which:

FIGS. 3A and 3B are illustrate various elements of a formatting standard for transmitting an overload indication in accordance with various embodiments;

FIG. 6A is a flow diagram of user device behavior is accordance with various embodiments;

FIG. 6B is a flow diagram of network device behavior in accordance with various embodiments; and FIG. 7 a computing platform that may be used for implementing, for example, the devices and methods described herein, in accordance with an embodiment.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

An embodiment provides signaling storm recovery for WiFi authentication processes with an integrated evolved packet core (EPC) network. An embodiment provides IEEE 802.11 Access Network Query Protocol (ANQP)-based authentication signaling storm prevention mechanisms, which may include providing network authentication status indications to a user equipment (UE). For example, in some embodiments, when a UE attempts to connect to a particular wireless local area network (WLAN), an access network (AN) indicates whether the authentication, authorization, and accounting (AAA) server is overload in the WLAN domain. If so, the UE implements an authentication retry policy (e.g., as set by the network) or selects another network rather than attempting to connect to the overloaded domain. The authentication retry policy may include implementing a retry timer or selecting another AN belonging to another operator to connect to after a maximum number of authentication attempts. In other embodiments, an AN may transmit an indication for whether authentication by a new user is permitted. If new user authentication is not currently permitted, the UE may implement an authentication retry policy or select another network. These indications may be transmitted by the AN using IEEE 802.11 ANQP. Other embodiments may also use a server's Access Network Discovery and Selection Function (ANDSF) policy to transmit the network authentication status indications and/or to configure authentication retry policies on UEs.

Figure 1:
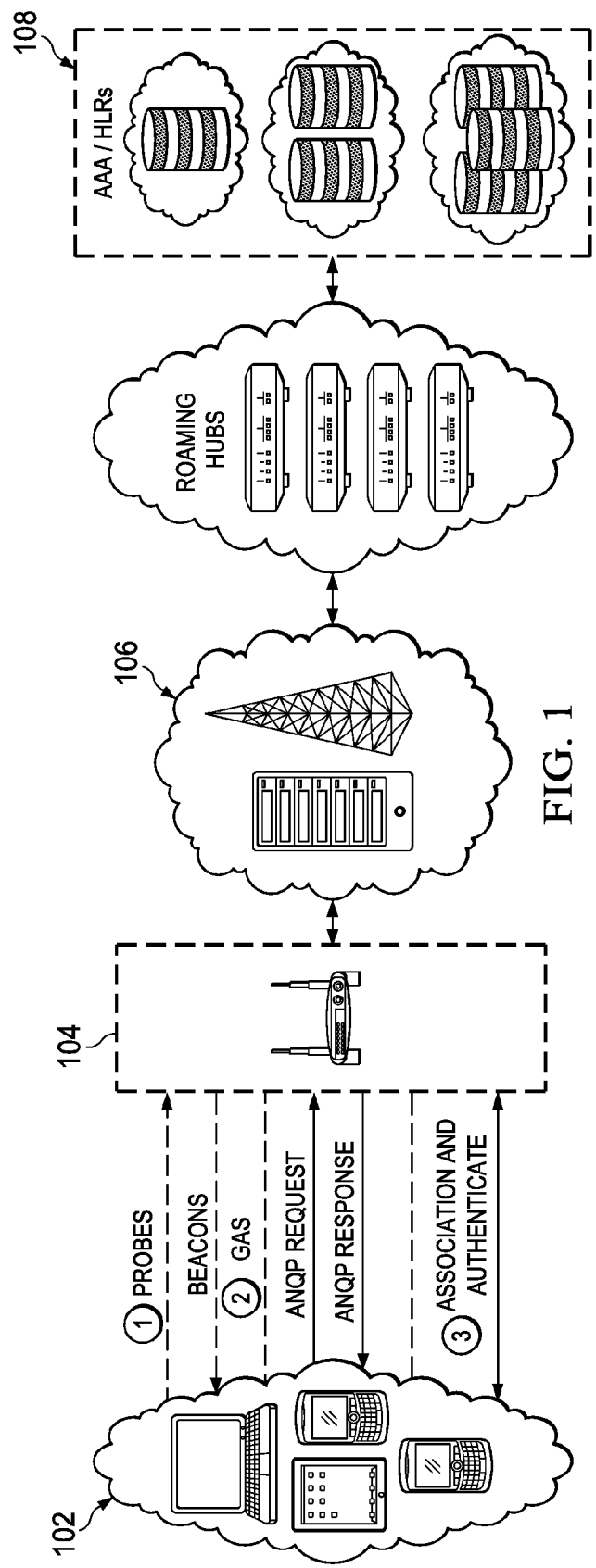
FIG. 1 is a block diagram of a network in accordance with various embodiments.

FIG. 1 illustrates Generic Advertisement Service (GAS) and ANQP operation during device authentication. First, a user chooses to connect to Wi-Fi, and the user's device (e.g., UE 102) scans for available hotspots. IEEE 802.11u GAS is used to provide for Layer 2 transport of an advertisement protocol's frames between UE 102 and a server in network 106 prior to authentication using access network (AN) 104's ANQP, a query/response operation. Access network 104 may be any suitable access network, such as, a WiFi hotspot, Access Point (AP), universal terrestrial radio access network (UTRAN), evolved UTRAN (E-UTRAN), and the like. The information provided through the ANQP typically includes the different features and available services of network 106. In some embodiments, network 106 is a WLAN that is owned by, subscribed to, or has roaming relationship with the UE 102's cellular operator. ANQP may also be used to provide UE 102 with one or more authentication status indications, which may notify UE 102 of an authentication server overload, whether new users are allowed to connect to a particular server, and the like. After UE 102 determines which AN to connect to, UE 102 carries out an authentication process, connects to an AN 104, and joins network 106. The authentication process may include interfacing with an authentication, authorization, and accounting (AAA) server (or a different authentication server) and home location registers (HLRs) 108. Network detection and selection policies, such as an ANDSF policy, may also set out parameters for determining when and how UE 102 selects ANs and/or other networks (e.g., cellular networks).

UE 102 may be any of the devices illustrated in FIG. 1, such as a cell phone, laptop, tablet, smart sensor, handheld or consumer electronic device, and other user devices that have a WiFi interface that can interact with a WiFi network. These devices also may be able to interact with other types of communication networks, such as a cellular network. Access network (AN) 104 and one or more UEs can form a basic service set (BSS), which is the basic building block of an IEEE 802.11 WLAN. AN 104 may communicate with an AN controller or an ANQP server, which can be collocated or not with AN 104. A BSS generally can be identified by a service set identifier (SSID), which is configured and may be broadcasted by AN 104.

Figure 2:
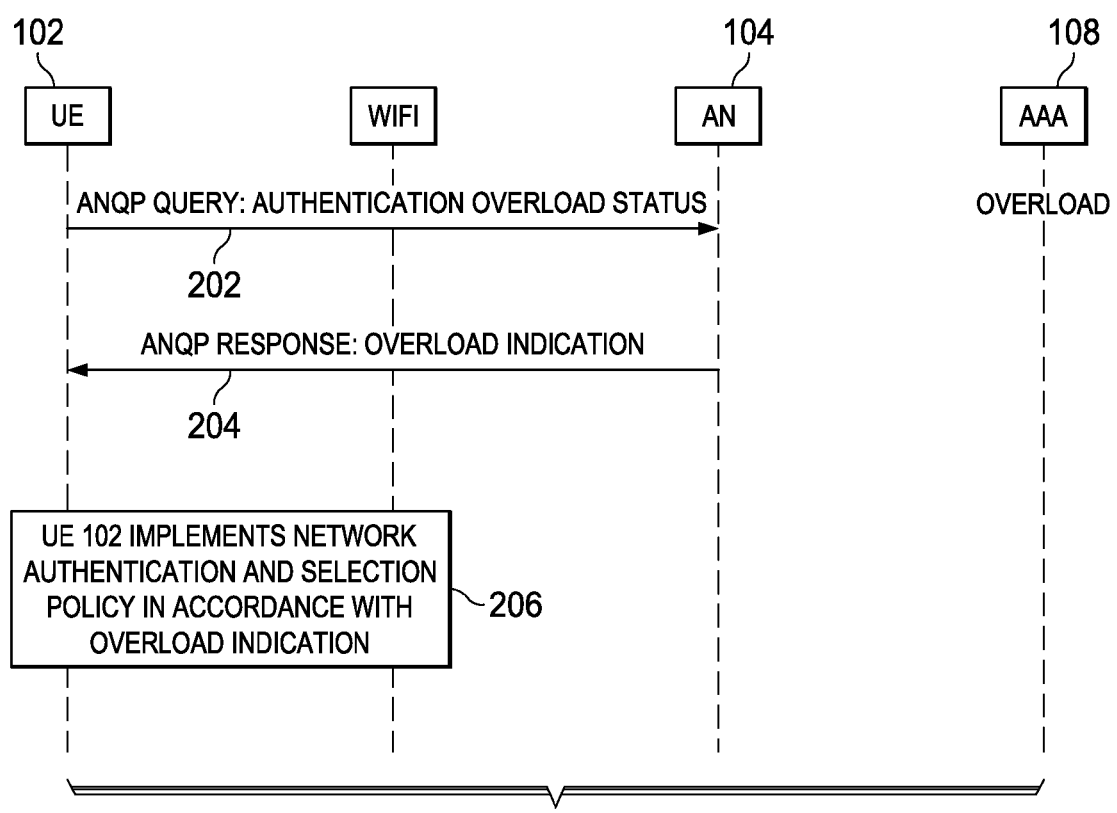
FIG. 2 is a flow diagram of a network transmitting an authentication server overload indication in accordance with various embodiments.

FIG. 2 illustrates a flow diagram showing a network using IEEE 802.11 ANQP query/response messages to transmit an authentication server overload indication in accordance with various embodiments. In step 202, a user's device (e.g., UE 102) may send an ANQP query requesting authentication server overload status. The ANQP query may be sent to an AN (e.g., AN 104) of a network which the user wishes to connect to. In step 204, an ANQP response from a network device (e.g., AN 104) including an overload indication for whether authentication server (e.g., AAA server 108 or another authentication server) is overloaded. Authentication server 108 may be associated with an operator of a home network to which UE 102 belongs, or authentication server 108 may be associated with a visitor network through which UE 102 can reach to its home network (e.g., when UE 102 is in a roaming mode). Based on the received overload indication, in step 206, UE 102 implements a network authentication and selection policy. The network authentication and selection policy may include UE 102 deciding to continue authentication with AN 104, implement an authentication retry policy, select another network, and the like. For example, if the received overload indication indicates the authentication server is overloaded, UE 102 may decide not to continue the authentication process. Accordingly, UE 102 may implement an authentication retry policy. For example, the UE may wait for a retry timer to expire before another authentication attempt with AN 104 or select another AN (e.g., belonging to another operator) to connect to if a maximum number of authentication attempts has been made. Alternatively, if the received overload indication indicates the authentication server is overloaded, UE 102 may simply select another operator's network to connect to. As another example, if the ANQP response indicates the authentication server is not overloaded, then the UE may decide to continue the authentication process with AN 104/network 106. Although FIG. 2 illustrates the overload indication being transmitted using an ANQP response/query protocol, in other embodiments, the overload indication may be transmitted to UE 102 from the network using any other suitable means (e.g., broadcasted in a beacon, transmitted as a probe response, in an ANDSF policy, and the like).

The overload indication may be transmitted using any suitable format. In some embodiments, the overload indication is transmitted as an independent ANQP information element. For example, FIG. 3A illustrates an example information element format 300 in accordance with The WiFi Alliance's Hotspot 2.0 standard. Information element format 300 includes Info ID field 302, Length field 304, OI field 306, Type field 308, Subtype field 310, Reserved filed 312, and Payload filed 314. Info ID field 302 is a 2-octet field whose value is an ANQP vendor-specific element. Length field 304 is a 2-octet field whose value is used to determine the length of Payload field 314. For example, Length field 304's value may be a constant (or offset) plus the length of Payload field 314. OI field 306 is a 3-octet field used to identify the network's operator. For example, network operators may register for an operator-specific OI value (e.g., as set by The WiFi Alliance). These operator-specific OI values are known by devices operating in accordance with Hotspot 2.0 and may be used to identify the operator of the network. Type field 308 is a 1-octet field allocated from the WiFi Alliance technology identifier assignment to indicate a Hotspot 2.0 ANQP information element type is being transmitted. Subtype field 310 is a 1-octet field whose value is used to determine the subtype of the transmitted information element. For example, the value of Subtype field 310 may correlate with information element subtypes in a Subtype definition table 320 (e.g., Table 3 of Hotspot 2.0 as reproduced in FIG. 3B). Subtype field 308 may be used to indicate an overload indication information element is transmitted. In such embodiments, an overload indication element type may be added to Table 3 of Hotspot 2.0 and assigned a corresponding value (e.g., one of reserved values 12-255). Reserved field 312 is a 1-octet field that may be used to ensure that the header of the ANQP information element (e.g., fields 302 through 310) is word aligned.

Payload field 314 is a variable length field containing information specific to the information element and may be used to indicate AAA server 108 (or another authentication server) is overloaded. The value of Payload field 314 may also be an overload percentage, other relative quantity measure (e.g., an index), or other relevant information. The implemented network authentication and selection policy may vary depending on the values of payload field 314. Different overload percentages (or other relative overload conditions) may trigger different network authentication and selection policies/authentication retry policies. For example, a UE retry timer maybe shorter for slightly overloaded servers compared to very overloaded servers. In other embodiments, the overload indication may be transmitted using a different information element format, which may include more or less fields than fields 302 through 314 as illustrated in FIG. 3A.

In other embodiments, the overload indication may be added as an additional field in an existing ANQP network authentication type information element, 3GPP cellular network information element, another information element associated with the device's home network, or the like. For example, the overload indication may be included in a field added to a wide area network (WAN) metric information element, a network access indicator (NAI) home realm query information element, or another suitable information element.

Figure 4:
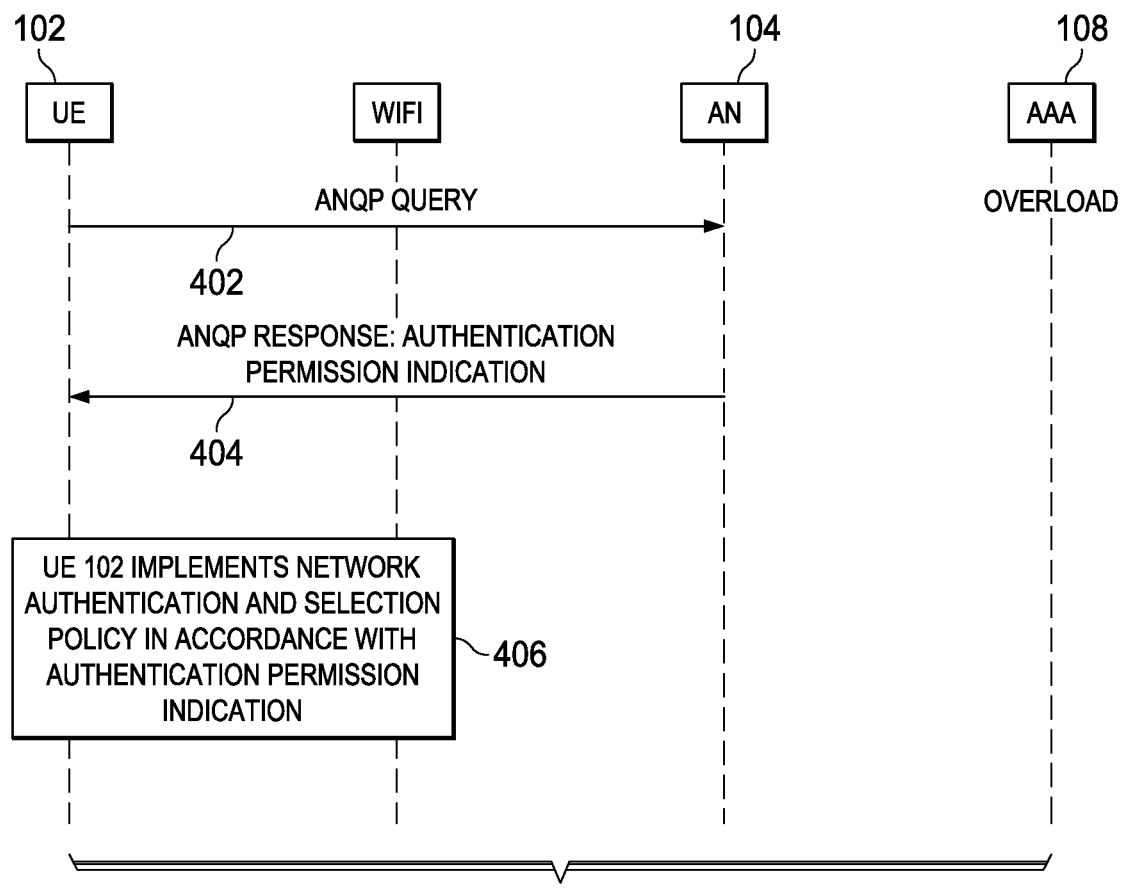
FIG. 4 is a flow diagram of a network transmitting a authentication permission indication in accordance with various embodiments.

FIG. 4 is a flow diagram showing a network using IEEE 802.11 ANQP query/response messages to transmit an authentication permission indication in accordance with various embodiments. The authentication permission indication indicates whether a new user's device (e.g., UE 102) that seeks authentication is currently allowed. This indication may be used to prevent additional new users from worsening an existing transaction overload situation in the network with additional authentication attempts. In step 402, UE 102 sends an ANQP query to the network requesting new user permission status. In step 404, an ANQP response from a network device (e.g., AN 104) includes an authentication permission indication, which indicates whether the network is currently accepting authentication attempts by new users. For example, new user authentication attempts may not be accepted by the network when the authentication server (e.g., AAA server 108 or another suitable authentication server) is overloaded, when the authentication server experiences downtime (e.g., due to failure, planned maintenance, planned upgrades, and the like), when other devices (e.g., databases/other servers) associated with the authentication server is overloaded/experiencing downtime, when the WLAN associated with the authentication server desires to keep existing user's/user's services at a certain level, and the like. Based on the received authentication permission indication, in step 306, UE 102 implements a network authentication and selection policy.

The network authentication and selection policy may include UE 102 deciding to continue authentication with AN 104, implement an authentication retry policy, select another network, and the like. For example, if the received authentication permission indication indicates new user authentication attempts are not currently allowed, UE 102 may decide not to continue the authentication process. Accordingly, UE 102 may implement an authentication retry policy. For example, the UE may wait for a retry timer to expire before another authentication attempt with AN 104 or select another AN (e.g., belonging to another operator) to connect to if a maximum number of authentication attempts has been made. Alternatively, if the received authentication permission indication indicates new user authentication attempts are not currently allowed, UE 102 may simply select another operator's network to connect to. As another example, if the ANQP response indicates new users authentication attempts are permitted, UE 102 may continue the authentication process with AN 104. Although FIG. 4 illustrates the authentication permission indication being transmitted using an ANQP response/query protocol, in other embodiments, the authentication permission indication may be transmitted to UE 102 from the network using any other suitable means (e.g., broadcasted in a beacon, a probe response, in an ANDSF policy, and the like).

Furthermore, the authentication permission indication may be transmitted in lieu of or in addition to the overload indication. For example, in some situations a server may still allow new users even though it is overloaded. Thus, both an overload indication and an authentication permission indication may be transmitted. The UE may decide whether to continue authentication with the network based on a policy (e.g., an ANDSF policy), which may be configured by the UE's operator.

In some embodiments, multiple authentication permission indications may be transmitted. For example, an AN may provide a connection to a WLAN owned by a first operator, and the AN also provide home network access to another operator's network (e.g., when the other operator's UEs are in a roaming mode). A first authentication permission indication may be transmitted for the first operator's WLAN, which may be used to indicate whether new users of the first operator may authentication with the AN or WLAN. The first authentication permission indication may be transmitted in a response message or broadcast message. A second authentication permission indication may be transmitted for home network access to users of the second operator. The second authentication permission indication may be used to indicate whether the second operator's users may access the second operator's home network directly or indirectly using the AN. The second indication may be based on server load of both the first operator's WLAN and the second operator's network. The second authentication permission indication may be transmitted as an ANQP response associated with the second operator's home network information in a UE's ANQP query. Thus, multiple authentication permission indications may be transmitted by an AN.

In some embodiments, the authentication permission indication may be transmitted as a separate information element. For example, format 300 of FIG. 3A may be used to transmit an authentication permission indication. In such embodiments, Subtype field 308 and Table 320 may be updated accordingly to indicate an authentication permission indication is being transmitted. In other embodiments, the authentication permission indication may be transmitted in a new field of an existing ANQP information element. Although FIG. 4 illustrates an ANQP protocol used to transmit an authentication permission indication, other network selection and discovery mechanisms, such as ANDSF may be used to transmit the indication.

Furthermore, while FIGS. 2 and 4 illustrate two example network authentication status indications relating to authentication server status, network authentication status indications may be used by other management network nodes to indicate other network conditions such as network selection functions, quality of service (QoS), policy control functions, and the like. For example, the network authentication status indication may be used to indicate the QoS levels currently supported by a network server (e.g., when video transmissions are not supported). If UE 102 desires a higher QoS level (e.g., if UE desires video transmissions), UE 102 may decide not to continue the authentication process and implement an authentication retry policy or select another network. For some operators that do not want network node information to be visible to UEs, the overload indication may be changed to only indicate whether there is a generic authentication transaction overload in the network, not whether a particular network server is overloaded.

Figure 5:
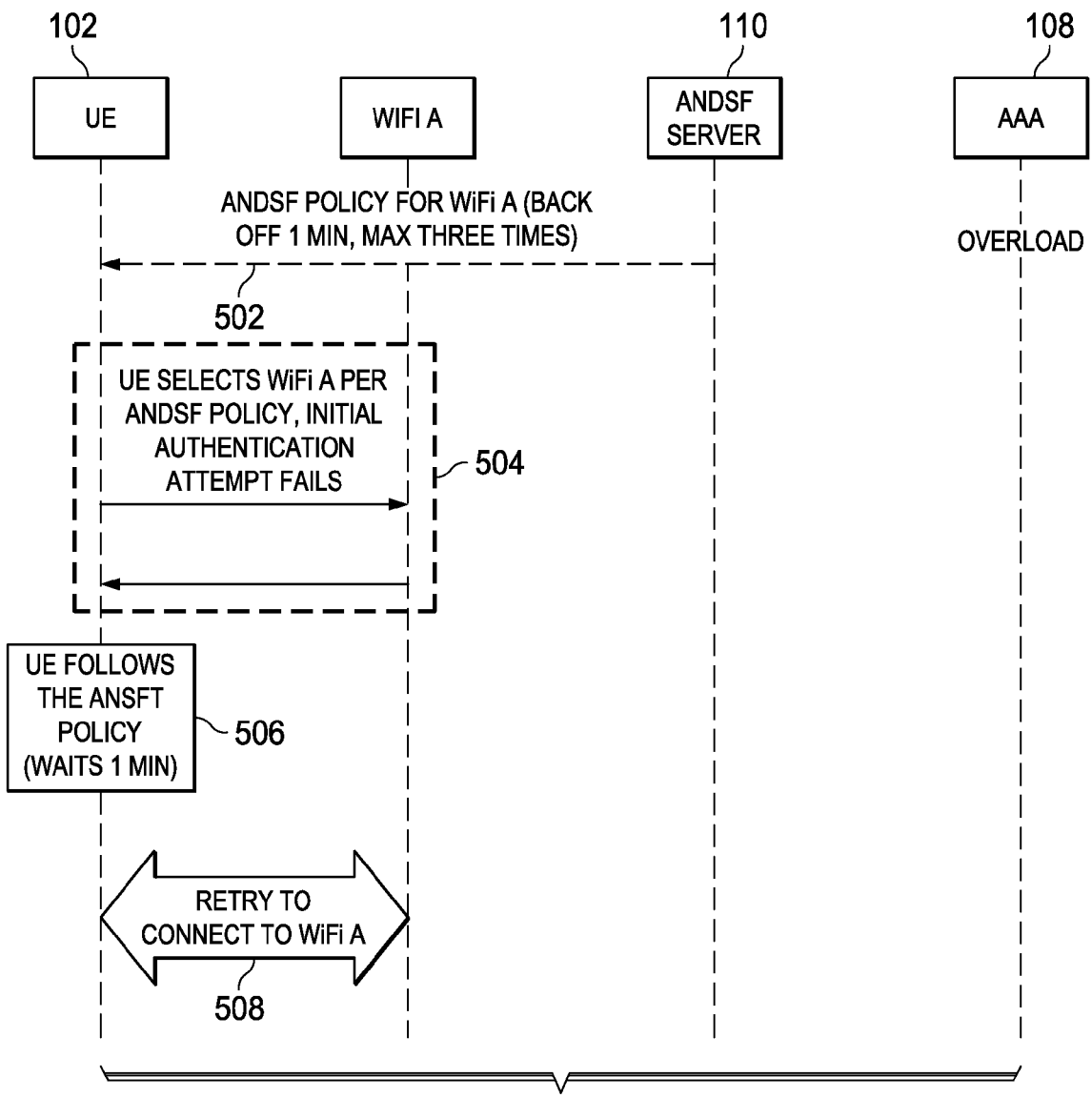
FIG. 5 is a flow diagram of a network transmitting an authentication retry policy in accordance with various embodiments.

FIG. 5 illustrates a flow diagram showing a network implementing an authentication signaling storm prevention mechanism in accordance with various embodiments. The network may implement an operator-defined authentication retry policy to a user's device (e.g., UE 102) when authentication fails or when the UE decides not to continue an authentication process (e.g., based on one or more authentication status indications). In step 502 the network may transmit the authentication retry policy to UE 102, for example, from ANDSF server 110 as part of an ANDSF server policy (e.g., as part of the inter-system mobility policy (ISMP) or inter-system router policy (ISRP) routine rules). Alternatively the authentication retry policy may be transmitted as a separate network policy or pre-configured on UE 102 by the operator. The authentication retry policy may be specific to particular ANs and WLANs network (labeled as WiFi A). For example, different authentication retry policies may be configured for different WLANs. Furthermore, the authentication retry policy may be a generic UE retry policy for the selected network (WiFi A) when the UE confronts difficulty in connecting to the network, or the authentication retry policy may be directed at one or more specific authentication failure scenarios (e.g., when the UE loses the connection with the current WLAN and tries to reconnect to the network).

The authentication retry policy may include a backoff or retry timer (e.g., 1 minute), a maximum number (e.g., 3) of authentication attempts with the selected network, and the like. If UE 102 cannot successfully connect to the selected network after the maximum number of authentication attempts, UE 102 may select another network (e.g., belonging to another operator) to connect to. When UE 102 is on a roaming connection, the authentication retry policy may also include a policy that indicates whether UE 102 is allowed to select another network if the initial connection attempt fails or if another connection attempt may be made after the duration (e.g., 1 min) set by the retry timer expires. Other authentication retry policies may implement retry timers of different lengths and/or implement a different maximum number of authentication attempts. Furthermore, other authentication retry policies may implement different authentication retry parameters.

In step 504, UE 102 fails to authenticate with the selected network. Selection of WiFi A may be done by UE 102 based on selection criteria also set by the ANDSF policy. Failure to authenticate with WiFi A may include UE 102 failing to establish a connection, receiving an overload indication indicating the authentication server is overloaded, receiving an authentication permission indication indicating new user authentication attempts are not permitted, and the like. In step 506, UE 102 waits for a retry timer to expire (e.g., after 1 min) before attempting to connect to WiFi A again. After the retry timer expires, in step 508, UE 102 attempts the authentication procedure again with WiFi A. If after the maximum number of authentication attempts all end in failure, UE 102 may select another network (e.g., belonging to another operator) to connect to.

FIG. 6A illustrates a flow diagram of a process flow 600 for user device behavior in accordance with various embodiments. In step 602, the user device (e.g., UE 102) selects an AN (e.g., AN 104) for establishing a network connecting to a network (e.g., WLAN 106). The AN may be associated with a network owned by, subscribed to, or has a roaming relationship with the user device's operator. Selection of an appropriate AN may be done in accordance with a network selection policy, e.g., an ANDSF policy, configured by the operator. In step 604, the user's device receives one or more network authentication status indications, for example, through an ANQP query/response, a broadcasted beacon, probe response, in the ANDSF policy, or the like. The network authentication status indications may include an overload indication (e.g., indicating whether the authentication server associated with the selected network is overloaded), a authentication permission indication (e.g., indicating whether the authentication is accepting new user authentication requests), or the like.

In step 606, the user's device implements a network authentication and selection policy based on the received network authentication status indications. For example, when the user's device receives a authentication status indication indicating the authentication server is overloaded or that the network is not currently allowing authentication attempts by new users, the user's device may decide not to continue the authentication process or selects a different AN (e.g., belonging to a different operator) to connect to. If the user decides not to continue authentication, the user's device may implement an authentication retry policy. The authentication retry policy may include a retry timer before another authentication attempt with the selected network. The authentication retry policy may also include a maximum number of authentication attempts before selecting another AN (e.g., belonging to a different operator) to connect to. As another example, if the user device decides to continue the authentication process, the user's device authenticates and connects with the selected network through the selected AN.

FIG. 6B illustrates a flow diagram of a process flow 620 for network device behavior in accordance with various embodiments. In step 622, the network device (e.g., AN 622) determines a network's authentication status (e.g., whether or not a network authentication server is overloaded or accepting new users). Based on the network's authentication status, in step 624, the network device may transmit one or more network authentication status indications to a user's device. For example, the network device may transmit an overload indication, an authentication permission indication, a network selection function indication, a quality of service (QoS) indication, a policy control function indication, and the like based on the network's status.

FIG. 7 is a block diagram of a processing system 700 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, (e.g., a non-transitory computer readable storage medium), a mass storage device (e.g., a non-transitory computer readable storage medium), a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for network authentication and selection comprising:
    selecting, by a user equipment (UE), a first access network for establishing a network connection;
    receiving, by the UE, one or more network authentication status indications for a first network associated with the first access network; and
    implementing, by the UE, a network authentication and selection policy in accordance with the one or more network authentication status indications, wherein implementing the network authentication and selection policy comprises deciding, by the UE, whether to continue an authentication process with the first access network in accordance with the one or more network authentication status indications.

2. The method of claim 1, wherein implementing the network authentication and selection policy comprises:
    implementing, by the UE, an authentication retry policy when the UE decides not to continue the authentication process with the first access network.

3. The method of claim 2, further comprising receiving the authentication retry policy.

4. The method of claim 3, wherein receiving the authentication retry policy comprises receiving the authentication retry policy in an access network discovery and selection function (ANDSF) policy.

5. The method of claim 2, wherein implementing the authentication retry policy comprises waiting for a retry timer to expire before another authentication attempt with the first access network, wherein a length of the retry timer is defined by the authentication retry policy.

6. The method of claim 2, wherein implementing the authentication retry policy comprises selecting a second access network associated with a second network for establishing the network connection after attempting to authenticate with the first access network a maximum number of authentication attempts, wherein the maximum number of authentication attempts is defined by the authentication retry policy.

7. The method of claim 1, wherein implementing the network authentication and selection policy comprises selecting a second access network associated with a second network for establishing the network connection in accordance with the one or more network authentication status indications.

8. The method of claim 1, wherein the one or more network authentication status indications comprise an overload indication indicating whether an authentication server associated with the first network is overloaded.

9. The method of claim 1, wherein the one or more network authentication status indications comprise a authentication permission indication indicating whether the first network is allowing new user authentication attempts.

10. The method of claim 1, wherein the one or more network authentication status indications comprise a network selection function indication, a quality of service (QoS) indication, a policy control function indication, or a combination thereof.

11. The method of claim 1, wherein receiving the one or more network authentication status indications comprises receiving the one or more network authentication status indications in an Access Network Query Protocol (ANQP) response, a beacon, a probe response, an Access Network Discovery and Selection Function (ANDSF) policy function, or a combination thereof.

12. The method of claim 1, wherein the first network is a home network of an operator of the UE or a network having roaming relationship with an operator of the UE.

13. A user equipment (UE) comprising:
  a processor; and
  a non-transitory computer readable storage medium storing programming for execution by the processor, the programming including instructions to:
    select an access network for establishing a network connection;
    receive one or more network authentication status indications for a network associated with the access network; and
    implement a network authentication and selection policy in accordance with the one or more network authentication status indications, wherein the instructions to implement the network authentication and selection policy includes further instructions to decide whether to continue an authentication process with the access network in accordance with the one or more network authentication status indications.

14. The UE of claim 13, wherein the one or more network authentication status indications comprises an overload indication indicating whether an authentication server associated with the network is overloaded, an authentication permission indication indicating whether the network is allowing new users authentication attempts, a network selection function indication, a quality of service (QoS) indication, a policy control function indication, or a combination thereof.

15. The UE of claim 13, wherein the instructions to implement the network authentication and selection policy includes further instructions to:
  implement an authentication retry policy when the UE decides not to continue the authentication process with the access network.

16. The UE of claim 15, wherein the authentication retry policy defines a retry timer, a maximum number of authentication attempts, or a combination thereof.

17. The UE of claim 13, wherein the instructions to implement the network authentication and selection policy includes further instructions to select a different network associated with a different network for establishing the network connection in accordance with the one or more network authentication status indications.

18. The UE of claim 13, wherein the one or more network authentication status indications is received in one or more independent information elements.

19. The UE of claim 13, wherein the one or more network authentication status indications is received in one or more fields of one or more information elements.

* * * * *